(Model.)

C. F. SHAW.
Corn Sheller.

No. 240,556. Patented April 26, 1881.

WITNESSES:
C. Neveux
C. Sedgwick

INVENTOR:
C. F. Shaw
BY Munn & Co
ATTORNEYS.

UNITED STATES PATENT OFFICE.

CHARLES F. SHAW, OF BOSTON, MASSACHUSETTS.

CORN-SHELLER.

SPECIFICATION forming part of Letters Patent No. 240,556, dated April 26, 1881.

Application filed October 23, 1880. (Model.)

*To all whom it may concern:*

Be it known that I, CHARLES F. SHAW, of Boston, in the county of Suffolk and State of Massachusetts, have invented a new and Improved Corn-Sheller, of which the following is a specification.

The object of my invention is to provide an improved corn-sheller which is simple in construction, compact, and durable, and with which an ear of corn can be shelled very rapidly and perfectly without crushing or bruising the kernels and without any great exertion of power on the part of the operator.

The invention consists in a corn-sheller formed of two semi-annular sections, each provided with an arm, which arms are pivoted to each other at the outer ends, so that the sections can be swung open or closed. These sections each have a series of teeth, all tapering toward the same point, fastened to the inner sides, so that an ear of corn is passed in between the semi-annular sections, and the latter are held tightly while the ear is being rotated to and fro. The teeth will tear the kernels from the cob or ear.

Figure 1:
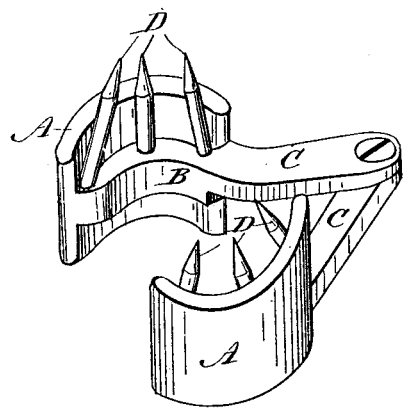
Figure 2:
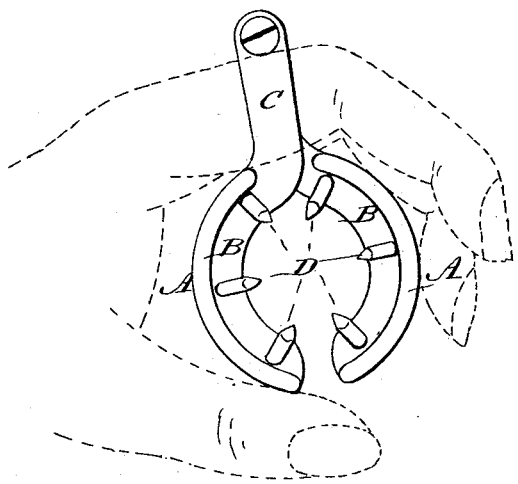

Figure 1 is a perspective view of my improved corn-sheller, showing it opened. Fig. 2 is an end elevation of the same, showing it closed and the manner of holding it.

Similar letters of reference indicate corresponding parts.

The corn-sheller is formed of two semi-annular or semi-cylindrical sections, A A, provided with a ridge, B, on the inside, which ridge is extended and forms an arm, C. The arms of the two sections A A are pivoted to each other at the outer ends, thus permitting the sections to swing on this point, so that it can be opened and closed, as may be desired. A series of teeth, D D, pointed at the end, are fastened to corresponding edges of the ridge B B of each section in such a manner that the teeth are all slightly inclined toward each other—that is, taper toward one point; but the teeth need not necessarily be fastened to the ridge C, as stated, but may be fastened to the sections A A in any other suitable manner, the manner shown being preferred.

The operation of the sheller is as follows: The instrument is held between the thumb and forefinger of the left hand, the arms C C passing up between the forefinger and the finger adjoining it, as shown. The sections are then opened sufficiently to admit the smaller end of the ear of corn. If the latter is then rotated in either direction alternately, or even in one direction only, the teeth D D will catch in between the kernels of corn and will tear them from the cob. The two sections gradually separate as the cob increases in thickness.

I am aware that teeth have been arranged at right angles to the section-plates; but

What I claim as new is—

The combination, with two curved plates, A A, of two guides, B B, formed on the inside of the plates, provided with opposite teeth, D, and carrying arms C C, hinged together at their outer ends, the whole adapted to shell corn by hand, as described.

CHARLES F. SHAW.

Witnesses:
FRANK J. MAHAN,
WILLIAM A. ARMSTRONG.